(12) United States Patent
Ji et al.

(10) Patent No.: US 10,824,397 B2
(45) Date of Patent: Nov. 3, 2020

(54) RANDOM NUMBER GENERATION

(71) Applicant: Liverpool John Moores University, Liverpool (GB)

(72) Inventors: Zhigang Ji, Liverpool (GB); Jianfu Zhang, Liverpool (GB)

(73) Assignee: LIVERPOOL JOHN MOORES UNIVERSITY, Merseyside (GB)

( * ) Notice: Subject to any disclaimer, the term of this patent is extended or adjusted under 35 U.S.C. 154(b) by 116 days.

(21) Appl. No.: 16/272,343

(22) Filed: Feb. 11, 2019

(65) Prior Publication Data
US 2019/0272152 A1 Sep. 5, 2019

(30) Foreign Application Priority Data
Mar. 1, 2018 (GB) .................................. 1803319.1

(51) Int. Cl.
G06F 7/58 (2006.01)
(52) U.S. Cl.
CPC .................................. G06F 7/588 (2013.01)
(58) Field of Classification Search
CPC ............................................... G06F 7/58–588
USPC .................................................. 708/250–256
See application file for complete search history.

(56) References Cited

U.S. PATENT DOCUMENTS

2005/0125471 A1* 6/2005 Sturm ..................... G06F 7/588
708/250
2008/0301210 A1* 12/2008 Dover .................. H04L 9/0866
708/250
2015/0169247 A1* 6/2015 Wang ...................... G06F 7/582
711/103
2017/0161022 A1* 6/2017 Chen ................. H01L 29/42324

OTHER PUBLICATIONS

X. Chen et al., "Modeling Random Telegraph Noise as a Randomness Source and its Application in True Random Number Generation," in IEEE Transactions on Computer-Aided Design of Integrated Circuits and Systems, vol. 35, No. 9, pp. 1435-1448, Sep. 2016 (Year: 2016).*
Mohanty et al., "RTN in Scaled Transistors for on-Chip Random Seed Generation,"IEEE Transactions on Very Large Scale Integration (VLSI) Systems, vol. 25, No. 8, Aug. 2017, 10 pages.
Runsheng et al., "New Observations on the AC Random Telegraph Noise (AC RTN) in nano-MOSFETs," Institute of Microelectronics, Semiconductor Manufacturing International Corporation, 2012, 2 pages.
Brederlow et al., "A Low-Power True Random Number Generator using Random Telegraph Noise of Single Oxide-Traps," Technology and Architecture Directions, IEEE International Solid-State Circuits Conference, 2006, 10 pages.
Extended European Search Report for Application No. 19157790.7, dated Nov. 28, 2019, 5 pages.

(Continued)

Primary Examiner — Matthew D Sandifer
(74) Attorney, Agent, or Firm — Hoffman Warnick LLC

(57) ABSTRACT

Disclosed is a method of manufacturing a Random Telegraph Noise source for use within true random number generators, comprising: subjecting a single semiconductor device to stress for a given period of time; and conditioning the single semiconductor device for a given period of time. Also disclosed is a true random number generator and a method of generating true random numbers.

14 Claims, 3 Drawing Sheets

(56) References Cited

OTHER PUBLICATIONS

Combined Search and Examination Report for GB Application No. GB1803319.1, dated Sep. 13, 2018, 7 pages.
Manut et al., "Impact of Hot Carrier Aging on Random Telegraph Noise and Within a Device Fluctuation," IEEE Journal of the Electron Devices Society, vol. 4, No. 1, Jan. 2016, 7 pages.
Ota et al., "Experimental Study of Random Telegraph Noise in Trigate Nanowire MOSFETs," IEEE Transactions on Electron Devices, vol. 62, No. 11, Nov. 2015, pp. 3799-3804.
Mori et al., "Mechanism of Random Telegraph Noise in Junction Leakage Current of Meta-Oxide-Semiconductor field-effect transistor," Journal of Applied Physics 111, Central Research Laboratory, Hitachi, Ltd.
Cho et al., "Study on Time Constants of Random Telegraph Noise in Gate Leakage Current Through Hot-Carrier Stress Test," IEEE Electron Device Letters, vol. 31, No. 9, Sep. 2010, pp. 1029-1031.
European Search Report for Application No. 19157790.7, dated Jul. 24, 2019, 5 pages.

\* cited by examiner

RANDOM NUMBER GENERATION

BACKGROUND OF THE INVENTION

The present invention relates to true random number generators (TRNGs) and methods of generating random numbers, and more particularly, methods of manufacturing a random telegraph noise (RTN) noise source from a single semiconductor device.

Random number generators are heavily used in cryptography, gambling, computer simulation, and other areas where producing an unpredictable result is desirable. In applications having unpredictability as the paramount, such as in security applications, hardware generators are usually preferred over pseudo-random algorithms. True random number generators (TRNGs) harvest physical randomness as entropy sources. Traditional true random number generators have generally used means such as cosmic background radiation or radioactive decay measured over short timescales to generate a set of random numbers. However, the power consumption and design complexity of true random number generators are often high.

The recently proposed TRNG using Random Telegraph Noise (RTN) has been considered an ideal solution for future cryptographically secured applications in the Internet of Things (IoT) due to its simplicity, low power, and robustness against temperature and supply voltage variations. However, their practical use is hindered by two major deficiencies. Firstly, RTN-TRNGs are based on a single semiconductor device exhibiting clear RTN signal by one pre-existing trap. The percentage of such devices in one silicon wafer is very low; a large transistor array is usually needed in the design, out of which one transistor is selected manually by tuning the circuit after fabrication. This results in a requirement for a large design area and higher manufacturing costs.

Secondly, the speed of the RTN-TRNG has a strong correlation with $\tau$, the sum of the times to capture and emit an electron ($\tau c+\tau e$). The existing RTN-TRNGs operate under DC conditions and are slow. Voltage tuning is usually applied to optimise the bit rate. However, due to the opposite voltage dependence, no matter what gate voltage is applied to the semiconductor device, either $\tau c$ or $\tau e$ will increase, hindering further improvement.

Example embodiments aim to address problems associated with existing related solutions, whether specifically mentioned above or which can otherwise be appreciated from the discussion herein.

SUMMARY OF THE INVENTION

In one aspect there is provided a method of manufacturing a Random Telegraph Noise (RTN) source for use within true random number generators (TRNGs), comprising subjecting a single semiconductor device to stress for a given period of time and conditioning the single semiconductor device for a given number of time.

In one example, subjecting the single semiconductor device to stress comprises applying a positive voltage bias to the device.

In one example, conditioning the single semiconductor device comprises applying a negative voltage bias to the device.

In one example, the semiconductor device is a transistor.
In one example, the semiconductor device is a field-effect transistor (FED).

In one example, the stress that the semiconductor device is subjected to is a combination of electrical and thermal stress, or pure electrical stress, to generate additional traps. In one example, the stress that the semiconductor device is subjected to is radiation stress. In one particular example, subjecting the device to stress comprises applying a positive voltage bias equal to 1.9V to the semiconductor device for 50 seconds at a temperature of 125° C.

In one example, conditioning the semiconductor device comprises applying a negative voltage bias to the semiconductor device for 50 seconds at a temperature of 125° C. In one example, the negative voltage bias is equal to −1.5V.

In another aspect there is provided a true random number generator (TRNG) comprising a conditioned Random Telegraph Noise (RTN) source arranged to produce a single output, logic circuitry operable to remove the bias from the output acquired from the RTN source, and logic circuitry operable to sample the de-biased output and generate a true random number stream.

In one example, the true random number generator comprises a plurality of conditioned Random Telegraph Noise (RTN) sources arranged to produce a single output. In one particular example, the true random generator comprises two conditioned RTN sources.

In one example, the conditioned RTN source is arranged to produce a single output by means of amplification, digitisation, and combination through a transmission gate.

In one example, the logic circuitry operable to remove the bias from the output acquired from the conditioned RTN source comprises a latch. In one example, said latch is a bistable latch. In one example, the logic circuitry operable to remove the bias from the output acquired from the conditioned RTN source comprises an edge detector.

In one example, the logic circuitry operable to sample the de-biased output and generate a true number stream comprises a latch. In one example, the logic circuitry operable to sample the de-biased output and generate a true number stream comprises a buffer.

In one example, varying the number of conditioned Random Telegraph Noise (RTN) sources changes the frequency at which a signal is sampled. In one example, using n conditioned RTN sources results in a sampling frequency equal to (n)f.

In another aspect there is provided a method of generating true random numbers, the method comprising applying a varying DC voltage to a conditioned Random Telegraph Noise (RTN) source arranged to produce a single output, removing the bias from the output of the conditioned RTN source, sampling the de-biased output, and generating a true random number stream.

In one example, the varying DC voltage is a square wave.
In one example, applying a varying DC voltage to a conditioned Random Telegraph Noise source comprises applying 180°-shifted gate biases. In one example, a lowest-allowable gate bias (VgL) is applied for half a cycle, and a highest-allowable gate bias (VgH) is applied for the other half.

In one example, removing the bias from the output of a conditioned RTN source comprises obtaining a de-biased trace with 1s and 0s of equal probability by toggling only at a rising edge of said output.

In one example, sampling the de-biased output and generating a true random number stream comprises sampling at a given clock frequency, and generating a true random number stream with high entropy.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION OF THE EXAMPLE EMBODIMENTS

Figure 1:
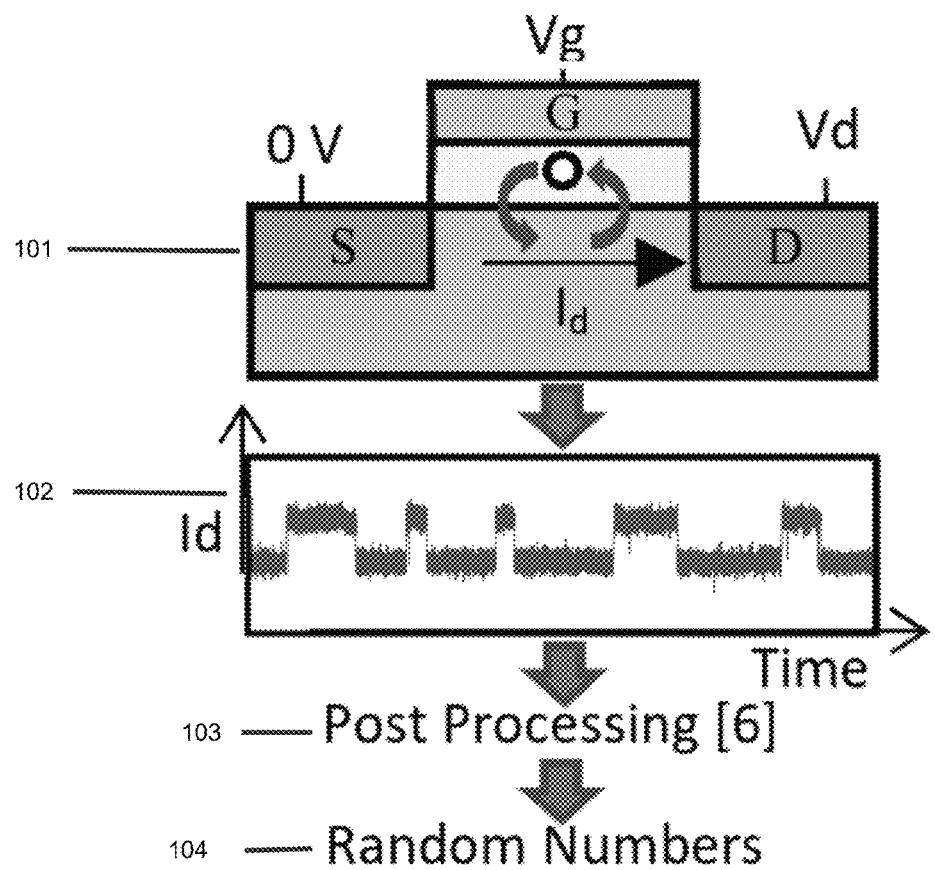
FIG. 1 illustrates an exemplary conventional method for true random number generation using Random Telegraph Noise (RTN) in semiconductor devices.

FIG. 1 illustrates an exemplary conventional method for true random number generation using Random Telegraph Noise (RTN) in semiconductor devices. In operation 101, the process of trapping/detrapping a single electron induces RTN. An RTN signal manifests itself in the form of drain voltage (Vd) or drain current (Id) fluctuations. Prior art methods rely on sampling the fluctuating signal (operation 102) and applying post-processing schemes (operation 103), such as the von Neumann algorithm, to de-bias the resulting signal. In operation 104, the de-biased signal is used to generate true random numbers.

Figure 2A:
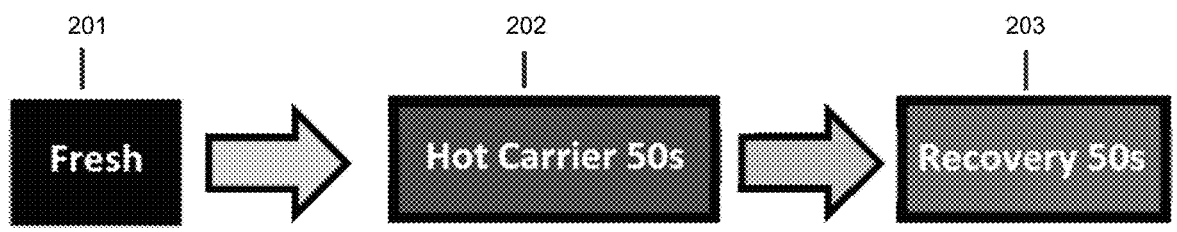
FIG. 2A illustrates the process of Random Telegraph Noise (RTN) generation using hot carrier stress in accordance with an embodiment of the present invention, and RTN signals after each step.

FIG. 2A illustrates the process of Random Telegraph Noise (RTN) generation using hot carrier stress in accordance with an embodiment of the present invention. The process involves exposing a fresh semiconductor device 201 to hot carrier stress for 50 seconds (operation 202). In operation 203, the device recovers for 50 seconds. As a result, a new trap can be generated. The generated trap still exists after accelerated recovery. Although FIG. 2A refers to exposing the fresh semiconductor device 201 to hot carrier stress for 50 seconds, it will be understood by those skilled in the art that any period of time that allows for generation of additional traps may be used in other embodiments. FIG. 2A shows the RTN signals recorded after each step of the above-described process.

Figure 2B:
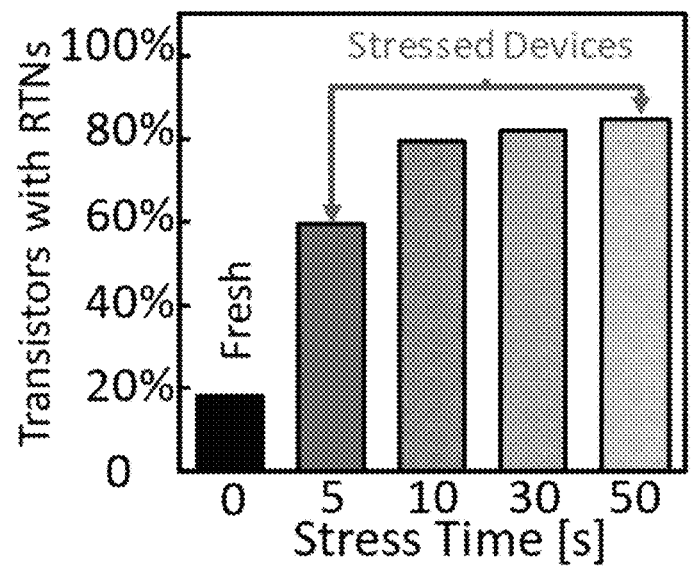
FIG. 2B illustrates the percentage of the semiconductor devices with observable Random Telegraph Noise (RTN) in accordance with an embodiment of the present invention.

FIG. 2B illustrates the percentage of the semiconductor devices with observable Random Telegraph Noise (RTN) in accordance with an embodiment of the present invention. The figure shows that although only 17% of the fresh devices exhibit RTN, subjecting the devices to hot carrier stress in accordance with the process illustrated in FIG. 2A increases the percentage up to 80%. As a result, bulky transistor arrays and the post-selection schemes known from the prior art can be avoided, as the TRNG entropy is acquired from the generated traps. Similar to the pre-existing ones, these traps also show strong voltage dependence and are highly stable. Their profile taken from the RTN measurements suggests that they could be located away from the Si/dielectric interface, which further supports their nature of generation.

Figure 3:
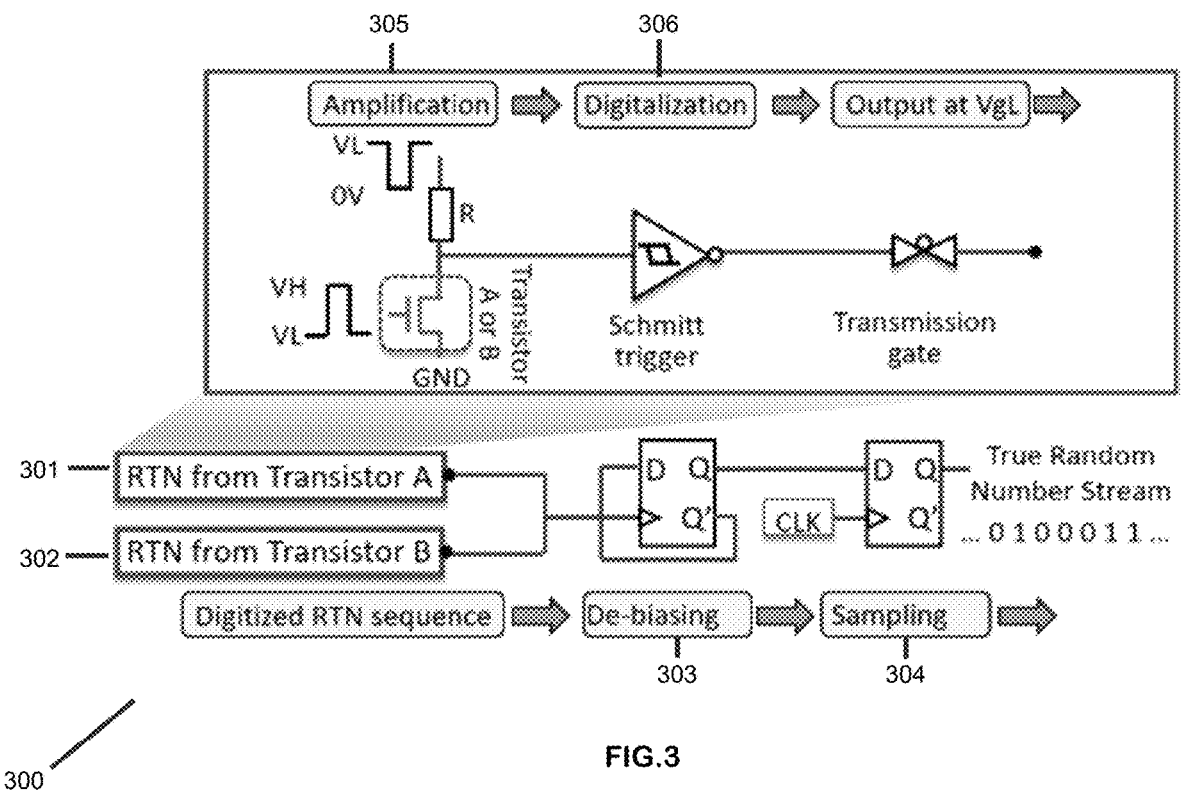
FIG. 3 illustrates a true random number generator schematic circuit in accordance with an embodiment of the present invention.

FIG. 3 illustrates a true random number generator 300 schematic circuit in accordance with an embodiment of the present invention. In this embodiment, two transistors are used to generate RTN alternately within one voltage period. While two transistors are shown in FIG. 3A, any other number of transistors is possible in other embodiments. Varying the number of transistors used for generating RTN varies the frequency at which the signal is sampled. In one exemplary embodiment of the invention, one transistor is used, and the sampling frequency is equal to f. In another exemplary embodiment of the invention, two transistors are used, and the sampling frequency is equal to 2f.

The true random number generator 300 comprises a first transistor 301 and a second transistor 302 connected in parallel. The transistors 301 and 302 have been conditioned to output RTN signal. The outputs of the transistors are multiplexed and connected to a de-biasing circuit 303. In the embodiment of FIG. 3, the de-biasing circuit 303 is a bistable latch. In other embodiments, the de-biasing circuit 303 may be an edge detector. The output of the de-biasing circuit 303 is connected to a sampling circuit 304. A clock signal is connected to the sampling signal 304. In the embodiment of FIG. 3, the sampling circuit 304 is a latch. In other embodiments, the sampling circuit 304 may be a buffer. The sampling circuit 304 outputs a true random number stream.

The true random number generator 300 further comprises a signal processing circuit in accordance with an embodiment of the present invention. An amplification unit 305 is realised by connecting the first transistor 301 or the second transistor 302 in common-source configuration. The output from the amplification unit 305 is connected to a digitalisation unit 306. In the embodiment of FIG. 3, the digitalisation circuit 306 is a Schmitt trigger. The output of the digitalisation unit is used to produce an output at VgL. In the embodiment of FIG. 3, a transmission gate is used to provide the output at VgL.

Figure 4:
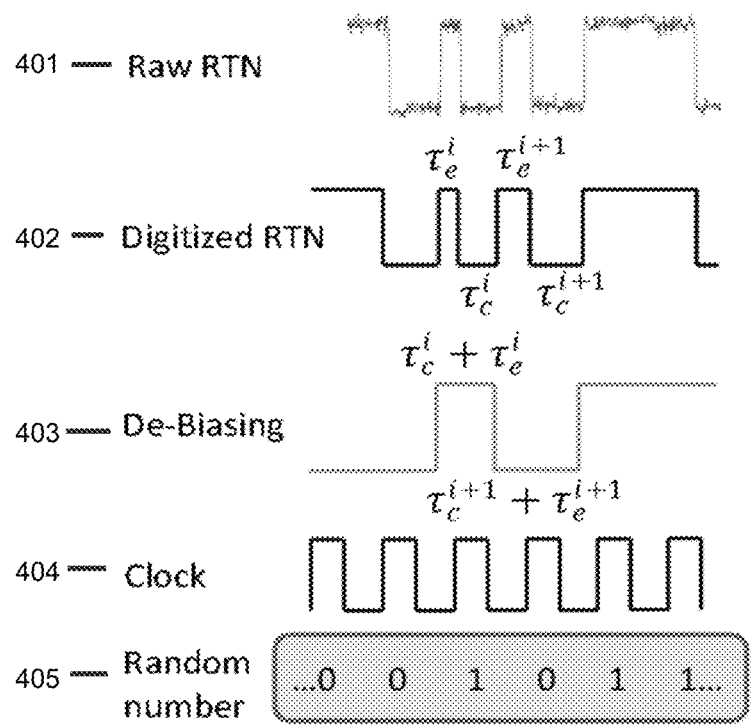
FIG. 4 illustrates the procedure of converting Random Telegraph Noise (RTN) to random bit stream in accordance with an embodiment of the present invention.

FIG. 4 illustrates the procedure of converting Random Telegraph Noise (RTN) to a random bit stream in accordance with an embodiment of the present invention. The waveform 401 illustrates a raw RTN signal acquired from a semiconductor device. The waveform 402 illustrates the signal 401 after digitalisation. The waveform 403 shows the digitised signal 402 after de-biasing. By using the intrinsic property of RTN, true randomness may be obtained without post-processing. For a given trap, it is known that the sum of the times for capturing and emitting a charge carrier ($\tau c + \tau e$), when averaged, is a constant against time. Therefore, by toggling only at the rising edge of the digitised signal 402, a new trace with 1s and 0s of equal probability is obtained, making it truly random without complicated post-processing. The de-biased signal 403 is then sampled at a given clock frequency 404, generating a random number stream 405.

Figure 5:
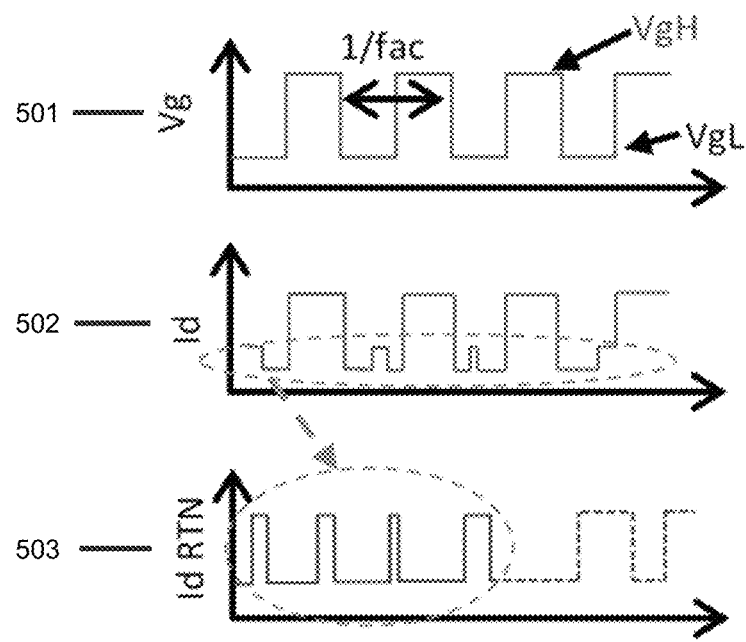
FIG. 5 illustrates the procedure for measuring Random Telegraph Noise (RTN) at variable DC mode in accordance with an embodiment of the present invention.

FIG. 5 illustrates the procedure for measuring Random Telegraph Noise (RTN) under variable DC conditions in accordance with an embodiment of the present invention. Prior art RTN-TRNGs operate under constant DC conditions and are relatively slow. Voltage tuning is usually applied to optimise the bit rate. In accordance with an embodiment of the present invention, a variable DC voltage is provided. The current is sensed under VgL for half cycle after VgH is applied for the other half. That is, a very low gate voltage is applied for half the duration of a cycle to enable current measurements at low power consumption, followed by an application of a high voltage to trigger the traps. This allows $\tau c$ and $\tau e$ to be controlled by VgH and VgL independently. The reduction in $\tau c$ and $\tau e$ is only limited by measurement accuracy (for the lowest-allowable VgL) and device reliability (for the highest-allowable VgH). Compared with constant DC operation, operating under variable DC conditions may accelerate RTN by a factor of several hundred. A clear difference can be observed for the same semiconductor device when operating under constant DC and variable DC conditions. In addition, $\tau c$ and $\tau e$ may also be reduced by increasing the applied frequency, resulting in a faster TRNG. Furthermore, the amplitude of RTN has been found to be large under variable DC conditions, as the sensing voltage, VgL, is already in the sub-threshold region where strong percolation is expected, i.e. distribution of traps is non-uniform. In addition, such sub-threshold sensing scheme also naturally reduces power consumption.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Although a few preferred embodiments have been shown and described, it will be appreciated by those skilled in the art that various changes and modifications might be made without departing from the scope of the invention, as defined in the appended claims.

The invention claimed is:

1. A true random number generator comprising:
a conditioned Random Telegraph Noise, RTN, source generating a digital signal comprising a bias;
logic circuitry operable to remove the bias from the digital signal acquired from the RTN source; and
logic circuitry operable to sample the de-biased digital signal and generate a true random number stream,
wherein the RTN source is conditioned by applying a voltage for a given period of time to generate at least one additional trap.

2. The true random number generator according to claim , comprising a plurality of conditioned Random Telegraph Noise sources arranged to produce a single digital signal.

3. The true random number generator according to claim 1, wherein the conditioned RTN source is arranged to produce a single digital signal by means of amplification, digitisation, and combination through a transmission gate.

4. The true random number generator according to claim 1, wherein the logic circuitry operable to remove the bias from the digital signal acquired from the conditioned RTN source comprises a latch.

5. The true random number generator according to claim 1, wherein the logic circuitry operable to remove the bias from the digital signal acquired from the conditioned RTN source comprises an edge detector.

6. The true random number generator according to claim 1, wherein the logic circuitry operable to sample the de-biased digital signal and generate a true number stream comprises a latch.

7. The true random number generator according to claim 1, wherein the logic circuitry operable to sample the de-biased digital signal and generate a true number stream comprises a buffer.

8. A method of generating true random numbers, comprising:
applying a DC voltage to a conditioned Random Telegraph Noise, RTN, source to generate a digital signal comprising a bias;
acquiring and removing the bias from the digital signal output from the conditioned RTN source by first logic circuitry; and
sampling, by second logic circuitry, the de-biased digital signal to generate a true random number stream,
wherein the RTN source is conditioned by applying a voltage for a given period of time to generate at least one additional trap.

9. The method of claim 8, wherein applying a DC voltage to the conditioned RTN source comprises applying a varying DC voltage is applied to the conditioned Random Telegraph Noise source.

10. The method of claim 9, wherein the varying DC voltage applied to the conditioned Random Telegraph Noise source is a square wave.

11. The method of claim 9, wherein applying a varying DC voltage to a conditioned Random Telegraph Noise source comprises applying 180° -shifted gate biases.

12. The method of claim 8, wherein removing the bias from the digital signal of the conditioned RTN source comprises obtaining a de-biased trace with 1s and 0s of equal probability by toggling only when said digital signal changes.

13. The method of claim 12, wherein removing the bias from the digital signal of the conditioned RTN source comprises obtaining the de-biased trace with 1s and 0s of equal probability by toggling only at a rising edge of said digital signal.

14. The method of claim 12, wherein removing the bias from the digital signal of the conditioned RTN source comprises obtaining the de-biased trace with 1s and 0s of equal probability by toggling only at a falling edge of said digital signal.

* * * * *